INVENTOR
DONALD M. PUTNAM
ATTY.

May 30, 1961  D. M. PUTNAM  2,986,153
CONTROL VALVE FOR PNEUMATIC BRAKING SYSTEMS
Filed Sept. 27, 1957  3 Sheets-Sheet 2

INVENTOR
DONALD M. PUTNAM
by: Fred Gerlach
ATTY.

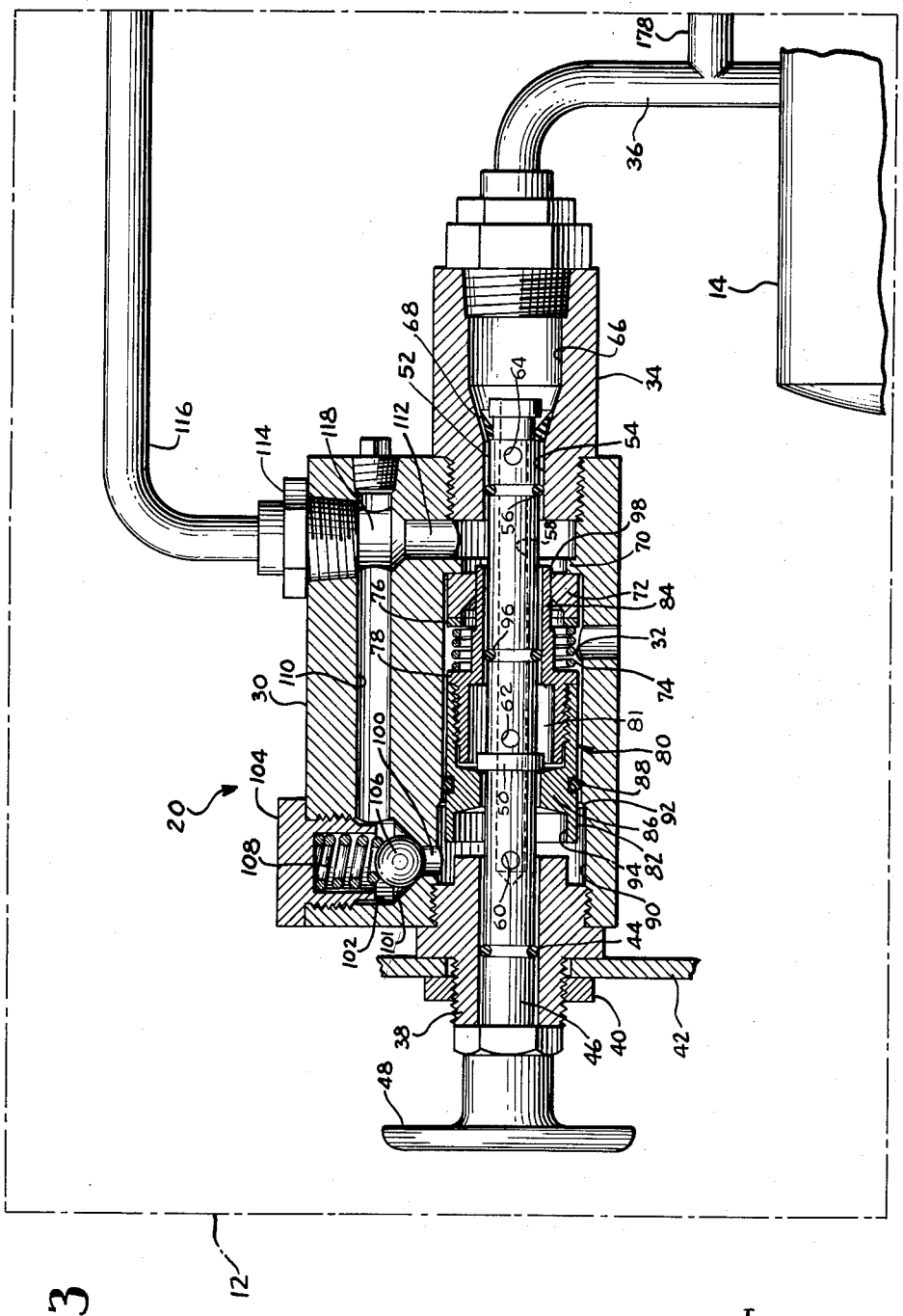

United States Patent Office 2,986,153
Patented May 30, 1961

2,986,153
CONTROL VALVE FOR PNEUMATIC BRAKING SYSTEMS
Donald M. Putnam, Chicago, Ill., assignor to Monarch Tool & Machinery Co., Chicago, Ill., a corporation of Illinois
Filed Sept. 27, 1957, Ser. No. 686,731
3 Claims. (Cl. 137—115)

The present invention relates to pneumatic braking systems for tractor-trailer combinations and more particularly to a novel braking system wherein the pneumatic braking instrumentalities on the tractor are operatively connected to the pneumatic braking instrumentalities on the trailer in such a manner that greater versatility of operation under various conditons, both normal and of an emergency nature, then has heretofore existed in connection with conventional systems, is made possible. The invention is specifically concerned with a pneumatic braking system of the type shown and described in my co-pending application Serial No. 656,702, filed on May 2, 1957, and entitled "Pneumatic Braking System for Tractor-Trailer Combination," over which system the present invention is designed as an improvement.

In compliance with Interstate Commerce Commission regulations, tractor drawn trailers are equipped with a braking system which operates automatically to engage the trailer brakes in the event of an emergency break away, application of the trailer brakes in such instances being effected under the control of a so-called emergency application or relay valve which, although it is capable of conserving the pressure built up in the trailer pressure tank, is obviously incapable of exerting any control over the tractor braking system. As a consequence the pressure existing in the tractor pressure tank is exhausted more or less rapidly with the result that the requisite pressure is not available for operation of the tractor brakes. This condition is only partially remedied by the provision of manual shut-off valves which are, more often than not interposed in the tractor service and emergency line and which usually are mounted on the tractor pressure tank itself, so that in the event of an emergency break away it is necessary for the operator to leave the cab for the purpose of gaining access to the valve for shut-off purposes. The invention of my co-pending application, as well as of the present invention, is designed to overcome the above-noted limitations that are attendant upon the use of conventional tractor-trailer braking systems and, toward this end, the present invention contemplates a novel system utilizing two separate but interconnected valve unit or assemblies, both units being capable of installation on the tractor with one of the units being interposed in both the tractor service and emergency lines and the other unit constituting a control unit for operation of the first unit and being installed in a convenient location in the tractor cab where it is readily accessible for manual operation by the operator. The cab-installed unit may be manually operated for initial trailer tank charging operations, the charging operation being automatically carried to completion upon an initial setting of the control unit. Thereafter the two units function to maintain the tractor brake system operatively connected to the trailer brake sysetm for simultaneous operation of both the tractor and trailer brakes by the operator. In emergencies involving an involuntary break-away, a manual disconnecting of the trailer from the tractor, or the presence of a leak in the emergency line or certain other portions of the system, the reduction of pressure within portions of the system and occasioned by such break-away or leaks will effect automatic sealing off of the emergency and service lines so that the pressure within the tractor pressure tank will be retained for proper tractor brake application under the control of the operator, while the usual emergency application or relay valve associated with the trailer will remain effective to apply the trailer brakes. The provision of a tractor-trailer brake system of the character briefly outlined being among the general objects of the invention, it is a more specific object to provide a system having valve assemblies associated therewith of the character and for the purpose briefly outlined above and in which the valve assembly which is connected in the trailer service line and trailer emergency line is so designed as to be self-draining, which is to say that it is devoid of any pockets or other recesses which would ordinarily constitute a blind trap for the accumulation of moisture-laden air so that in the event of below-freezing ambient temperatures there will be no danger of clogging or sticking of the valve parts due to precipitation and subsequent freezing.

Another object of the invention, in a system of this type, is to provide a trailer service line and trailer emergency line valve assembly together with a control valve assembly therefor, both of which valve assemblies are of simplified construction, and which by their mutual cooperation produce a materially simplified system having fewer parts than have heretofore been required in systems for the same general purpose.

An important feature of the present invention resides in the provision of a system of this sort having a trailer service line and trailer emergency line valve unit and a control valve unit, therefor, wherein the two units cooperate with each other and function in the manner briefly outlined above to effect automatic sealing off of the emergency and service lines during the specified emergency yet in which the control valve assembly is incapable of being manipulated to nullify or otherwise override the automatic operation of the system. The provision of a system which will accomplish this feature in a novel and effective manner is among the more important objects of the present invention.

Numerous other objects and advantages of the invention, not at this time enumerated, will become readily apparent as the following description ensues.

In the accompanying three sheets of drawings forming a part of this specification a preferred embodiment of the invention has been shown.

In these drawings:

Fig. 3 is a sectional view similar to Fig. 1 with the valve assembly parts being shown in different operative positions.

Figure 1:
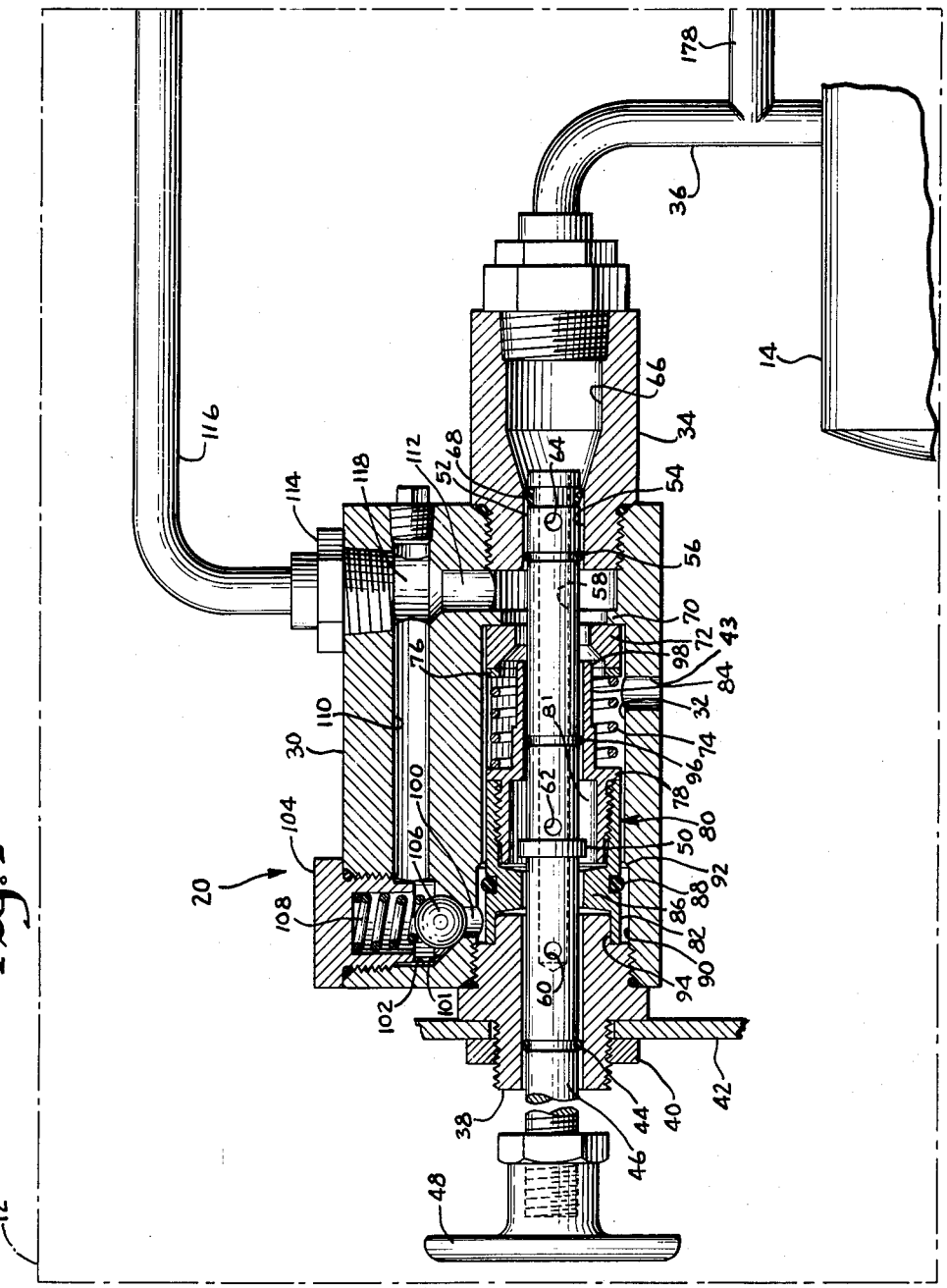
Fig. 1 is a sectional view taken substantially longitudinally and sectionally through a control valve assembly constructed in accordance with the principles of the present invention and constituting an element of the present braking system.
Figure 2:
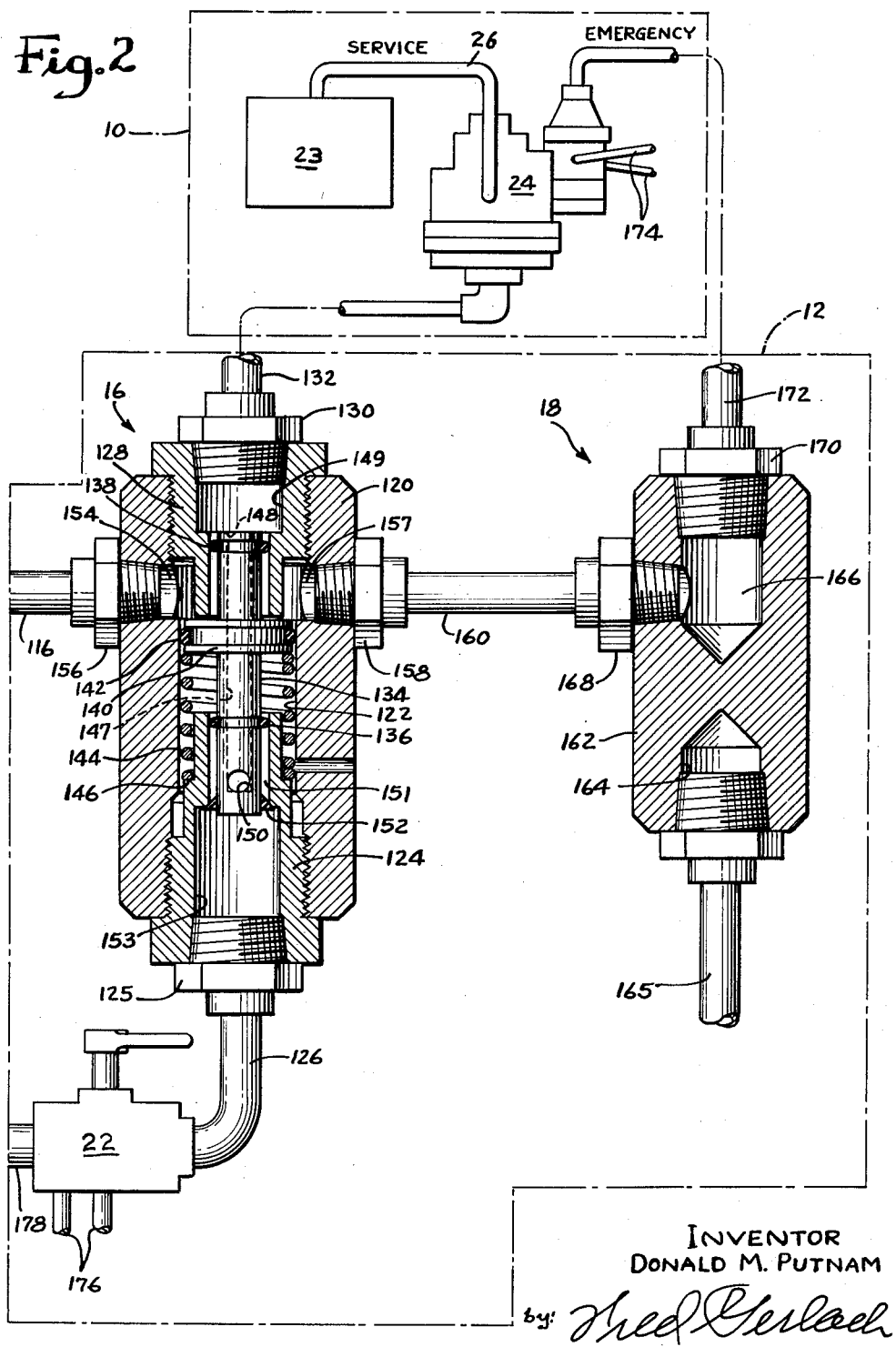
Fig. 2 is a sectional view taken substantially longitudinally and centrally through a service valve assembly and an emergency fitting assembly respectively and showing their operative connections to other instrumentalities of the system including the control valve of Fig. 1.

Figs. 1 and 2, when considered in combination, with the two views being placed in edge-to-edge registry, present a schematic view of a tractor-trailer air braking system constructed in accordance with the principles of the present invention with the various parts being operatively connected to one another.

Referring now to the drawings in detail, the system is designed for application to a tractor-trailer combination, the details of which have not been shown herein, but wherein the trailer is represented in Fig. 2 by the dotted rectangle 10 enclosing the trailer-mounted structure associated with the system and wherein the tractor is represented in both Figs. 1 and 2 by the dotted rectangle 12. Similarly enclosing the tractor-mounted structure associated with the system. It will be understood, of course, that both the tractor 12 and trailer 10 are of conventional design and no claim is made herein to any novelty associated with the same.

Considering Figs. 1 and 2 in conjunction with each other, the tractor-mounted mechanism of the system includes the usual compressed air tank 14 which is hereinafter referred to as the tractor pressure tank, and which, on most tractors, is mounted on the truck platform directly behind the tractor cab; a service valve assembly 16 which may be mounted on the pressure tank 14; an emergency fitting assembly 18 which may likewise be mounted on the pressure tank, a control valve assembly 20 which may be suitably mounted on the tractor instrument panel, the dashboard or other convenient portion of the tractor framework where it is readily available for manual operation, or which may be mounted on the floor of the driver's compartment and adapted for pedal operation; and a master control valve assembly 22 which may be pedal operated or manually operated, the latter method of actuation being illustrated herein purely for exemplary purposes. Irrespective of the specific mounting selected for the various units 14, 16, 18, 20 and 22 of the present control system, the essential features of the invention are at all times preserved.

The trailer-mounted mechanism of the present system forms no part of the invention and consist of the conventional trailer pressure tank or reservoir 23 (Fig. 2) and a relay or emergency application valve 24 connected thereto by a line 26 and which, as required by Interstate Commerce Regulations, supplies air to the trailer brakes from the pressure tank 23 to apply the brakes in the event of a break-away. The control valve 20 may be manipulated in a manner that will be made clear presently initially to charge the trailer pressure tank 23 with air under pressure from the tractor pressure tank 14 and to actuate the service valve assembly 16 and condition the system in such a manner that the valve 22 may be operated to simultaneously actuate both the tractor and the trailer brakes. After the control valve has been manually operated for initial charging of the trailer pressure tank 23, the system automatically becomes effective so that the tractor and trailer may become separated by an intentional disconnecting of the trailer, or by an unintentional or emergency break-away, with or without damage to or rupture of the connecting air lines or either one of them while the pressure existing within both the tractor pressure tank 14 and the trailer pressure tank 23 is conserved without appreciable loss of air so that, in any event, air under full tank pressure will be available for operation of the tractor brakes and for automatic application of the trailer brakes under the influence of the aforementioned relay or emergency application valve 24. Additionally, in the event of a leak in the system at any point on the outlet side of the control valve 20, means are provided whereby, when the pressure within the system drops below a predetermined minimum, the remaining pressure of air within the tractor pressure tank will be conserved, this pressure being sufficient for satisfactory operation of the tractor brakes, while the relay valve 24 may be relied upon to apply the trailer brakes automatically.

Referring now to Fig. 1, the control valve assembly 20 involves in its general organization a valve casing 30 provided with a longitudinal bore 32 therein, one end of which threadedly receives therein a nipple fitting 34 by means of which this end of the bore may be operatively connected to the tractor pressure tank 14 through a conduit or line 36. The other end of the bore 32 threadedly receives therein a guide fitting 38 having associated therewith a clamping nut 40 by means of which the fitting, and consequently the entire valve assembly 20 may be fastened to the instrument panel 42 or other fixed portion of the tractor compartment in an accessible position. The casing 30 is formed with a radial passage 43 in communication with the bore 32, the passage 43 constituting an exhaust air outlet for the system. Slidably disposed within the bore 32 and projecting through the guide fitting 38, and sealed therein by a resilient O-ring 44 is a plunger 46 having an operating knob 48 at its outer end, an enlarged medial piston portion 50 and an inner end portion 52 which is guided by and slidable within a bore 54 provided in the nipple fitting 34 and which is sealed to this bore by means of an O-ring 56.

The plunger 46 is provided with an internal longitudinally extending bore 58 therein of limited extent and a series of three radial passages 60, 62 and 64, respectively, communicate with this bore. The passage 60 is disposed between the piston 50 and the O-ring seal 44. The passage 62 is disposed adjacent the piston 50 on the side thereof opposite the passage 60. The passage 64 is disposed between the O-ring seal 56 and the extreme right hand end of the plunger 46. The fitting 34 is provided with an enlarged counterbore 66 into which the extreme end of the plunger 46 projects. A sealing ring 68 adjacent the right hand end of the plunger 46 is movable bodily with the plunger from a retracted position wherein it is disposed within the bore 54 and seals this latter bore from the counterbore 66, to an advanced position within it is disposed entirely within the counterbore 66 and establishes communication between the bore 54 and the counterbore 66. The bore 32 is formed with an annular web portion or seat 70 against which there is adapted to seat a resilient cup seal 72, the seal being normally pressed against the seat 70 by means of a spring 74 encircling the plunger 46 and bearing at one end against a washer 76 which, in turn, bears against the seal 72. The other end of the spring 74 bears against an external shoulder or flange 78 provided medially on a floating piston assembly which has been designated in its entirety at 80 and which is slidable within the bore 32 between the resilient cup seal 72 and the guide fitting 38.

The floating piston assembly 80 is composed of two interlocked parts each of which is generally of tubular configuration. These parts include a rear outer part 82 and a forward inner part 84, the latter part being telescopically and threadedly received within the former part and the two parts establishing an internal pressure chamber 81. The rear part 82 is provided with a thickened medial portion providing an internal rib 86 which closely hugs the plunger and which carries an O-ring seal 88. The bore 32 is provided with a slightly enlarged counterbore 90 which is connected to the bore 32 by a sealing shoulder 92. The O-ring seal 88 is normally maintained out of contact with the wall of the counterbore 90 but is adapted to seat against the shoulder 92 to seal the bore 32 from the counterbore when the floating piston 80 is moved to its advanced position against the action of the spring 74. The floating piston part 82 is formed with a cup-shaped recess 94 at its rear end, which recess is normally telescopically received over the forward end of the fitting 38 when the floating plunger assembly 80 is in its normal retracted position. The forward part 84 of the floating plunger assembly 80 is sealed to the plunger 46 by means of an O-ring seal 96 and the extreme forward open end or rim region 98 of the part 84 is designed for sealing engagement with the resilient cup seal 72 when the floating piston assembly 80 is in its advanced position.

The counterbore 90 in the valve body 30 communicates through a port 100 provided with a valve seat 101 with a radial passage 102, the outer end of which is closed by means of a threaded closure cap 104. A ball valve element 106 is spring pressed as at 108 against the seat 101 and normally serves to maintain the port 100 closed.

The valve casing 30 is formed with a longitudinally extending passage 110 which communicates with a second radial passage 112 in communication with the bore 54 provided in the fitting 34 and also in communication with the bore 32 through the central opening provided in the cup seal 72. The radial passage 112 communicates through a fitting 114 with one end of a conduit or line 116 leading to the trailer service valve assembly 16, the fitting 114 providing a two-way port 118 for the discharge of air from the casing 30 during trailer tank charging and certain other operations and for the entry of air during certain exhaust or bleed operation as will be described subsequently.

The trailer service valve assembly 16 is comprised of a valve casing 120, having a longitudinally extending bore 122 formed therein. The lower end of the bore 122 threadedly receives therein a sleeve 124 the lower open end of which is internally threaded to receive a fitting 125 communicating with a conduit 126 leading to the outlet side of the master control valve assembly 22. The upper end of the bore 122 is provided with a second sleeve 128 which is threaded internally to receive a nipple fitting 130 communicating with a conduit or service line 132 leading to the relay valve 24. The sleeve 128 is in axial alignment with the sleeve 124 and a plunger 134 has its opposite ends projecting into the sleeves 124 and 128, respectively, and is axially slidable therein. The end regions of the plunger 134 are sealed by means of O-ring seals 136 and 138 in the sleeves 124 and 128, respectively. A piston 140 formed on the plunger 134 is sealed by means of an O-ring seal 142 to the bore 122 and is slidable in this latter bore. A coil spring 144 bears at its upper end against piston 140 and at its lower end against a shoulder 146 provided on the sleeve 124 and serves to normally maintain the plunger and piston assembly in its uppermost retracted position.

The plunger 134 is formed with an axially extending bore 147 therein, the upper end of which opens as at 148 into an enlarged counterbore 149 formed in the sleeve 128 and the lower end of which communicates with a radial port 150. The port 150 opens into the annular space 151 normally existing between the seal 136 and a sealing ring 152 carried at the extreme lower end of the plunger 134. Upon depression of the plunger 134 against the action of the spring 144, the lower end of the plunger, including the sealing ring 152, is adapted to be projected into an enlarged counterbore 153 provided in the sleeve 124 so that communication between the counterbores 149 and 153 is established through the bore 147 or, in other words, directly through the valve assembly 16 from the line 126 to the line 132.

The valve body 120 is formed with an inlet port 154 which is connected through a fitting 156 with the line 116. The valve body 120 is provided with a similar port 157 which is connected with a fitting 158 with a conduit 160 leading to the trailer emergency fitting 18.

The trailer emergency fitting 118 includes a body portion 162 having a threaded socket 164 formed therein adapted to threadedly receive therein one end of a short pipe section 165 by means of which the fitting 18 may be rigidly supported from the tractor pressure tank, the pipe section being threadedly received in one of the threaded openings ordinarily provided in the pressure tank for cooperation with one of the two conventional manual shut-off valves associated with conventional systems but which have been eliminated by the present system. The valve body 162 is provided with an L-shaped passage 166 therein having fittings 168 and 170 received therein and by means of which passage and fittings the conduit 160 may be connected to the trailer emergency line 172 leading to the trailer relay valve 24. From the outlet side of the valve 24, the usual lines 174 extend to the trailer brakes and from the master control valve 22 the usual lines 176 extend to the tractor brakes.

Additionally, the inlet side of the valve 22 is connected through a line 178 to the line 36.

In the operation of the system, during hook-up operations when the tractor 12 is initially applied to the trailer 10, the operator will depress the knob 48 associated with the control valve assembly 20, thus shifting the plunger 46 bodily to the right as viewed in Fig. 1 and causing the radial passage 64 to be projected into the enlarged counterbore 66 so that tractor tank pressure will be established through the line 36, passage 64, bore 58 and radial passages 60 and 62. Pressure will thus be developed in the cup-shaped recess 94, as well as in the chamber 81 whereupon the floating piston assembly 80 will be moved bodily to the right so that the O-ring seal 88 will engage the shoulder 92 and enter the bore 32. At the same time, the rim region 98 of the part 84 of the floating piston assembly 80 will sealingly engage the resilient cup seal 72, thus preventing air issuing from the radial passage 62 from escaping through the exhaust outlet 43. As the floating piston assembly 80 continues to move to the right, the assembly becomes disengaged from the nipple fitting 38 and full tractor tank pressure will be applied to the assembly 80 so that the spring 74 will become fully compressed and the internal rib 86 will engage the medial piston portion 50 of the plunger 46 and maintain the latter fully depressed after manual pressure has been released. With the floating piston assembly 80 thus advanced to its extreme right hand position, and with the plunger 46 fully depressed so that the various parts of the valve assembly 20 assume the positions in which they are shown in Fig. 3, the pressure of air within the bore 32 will overcome the pressure exerted by the spring 108 on the ball valve element 106 so that air may pass outwardly through the port 100 and be conducted through passage 110, port 118, line 116, ports 154 and 157, conduit 160, L-shaped passage 166, trailer emergency line 172, relay valve 24 and line 26 to the trailer pressure tank 23 for charging purposes.

At such time as a predetermined pressure, for example, 30 pounds per square inch, is developed in the trailer pressure tank 23 and in the system leading thereto from the control valve assembly 20, the pressure developed in the service valve assembly 16 at the ports 154 and 157 and in the bore 122 above the piston 140 will overcome the action of the spring 144 and force the piston 140 downwardly in the bore 122. Such downward movement of the piston 140, and consequently of the plunger 134, will establish communication between the lines 126 and 132 as previously described so that full line pressure is available from the tractor pressure tank 14, through lines 36 and 178, master control valve 22, line 126, valve assembly 16, service line 132, relay valve 24 and lines 174 for actuation of the trailer brakes.

In the event that it becomes necessary to disconnect the tractor 12 from the trailer 10 manually, the operator will move the plunger 46 associated with the control valve assembly 20 to the left as seen in Fig. 1 to its fully retracted position, the sealing ring 68 will move into the bore 54 while at the same time the rim region 98 of the part 84 of the floating piston assembly 80 will become disengaged from the cup seal 72 so that pressure will be relieved in the trailer emergency line 172 through passage 166, line 160, ports 157, 154, line 116, radial passage 112, seal 72 and exhaust passage 43 to the atmosphere. Relief of pressure at the ports 157 and 154 allows the piston 140 associated with the service valve assembly 16 to assume its normal retracted position under the influence of the spring 144 so that the radial port 150 is withdrawn from communication with the enlarged counterbore 153, thus sealing off the line 126 and consequently rendering the master control valve 22 inoperative insofar as the service line connection is concerned. In accordance with standard practice, disconnecting of the lines 132 and 172 will cause the automatic relay valve to conduct air from the trailer pressure tank 23 to the trailer brakes through the lines 174. At the same time, retraction of the plunger 46 associated with the control valve 20 causes the seal 68 to be withdrawn from the counterbore 66 and moved into the bore 54 so that the pressure within the tractor tank 14 is entirely sealed and full tractor pressure tank will be maintained.

In the event of an emergency break-away, with or without rupture of either or both of the lines 132 and 172, the pressure existing at the ports 154 and 157 will, of course, immediately be relieved and there will be an onrush of air through the port 100 past the ball valve element 106, thus relieving pressure in the cup-shaped recess 94 of the floating piston assembly 80. This relief of pressure allows the floating piston assembly 80 to become partially retracted under the influence of the spring 74 so that the rim region 98 of the part 84 becomes withdrawn from the cup seal 72. At the same time, the O-ring seal 88 is withdrawn from the bore 32 and moved into the counterbore 90 so that the interior of the floating piston assembly 80 is in communication with the exhaust passage 43. Retraction of the floating piston assembly 80 will cause the medial rib 86 to release the piston portion 50 of the plunger 46 and the pressure of air against the end of the plunger as the air moves toward the exhaust port 43 will force the plunger 46 toward its retracted position until such time as the sealing ring 68 enters the bore 54. The pressure of air within the line 36 will thus fully be applied to the end of the plunger 46 so that the latter will be forcibly driven to its fully retracted position, thus sealing off the tractor pressure tank 14. Release of pressure at the ports 154 and 157 of the trailer service line valve assembly 16 will allow the piston 140 to become retracted under the influence of the spring 144 as previously described so that the radial port 150 will be sealed between the sealing rings 136 and 152 and the pressure of air within the tractor pressure tank 14 will be sealed against passage through the valve assembly 16.

In the event that for any reason whatsoever the pressure within the tractor pressure tank 14 falls below a predetermined minimum, which may be between 20 and 45 pounds per square inch, the pressure will be reduced in the cup-shaped recess 94, thus allowing the floating piston assembly 80 to become retracted under the influence of the spring 74 as previously described. Retraction of the floating piston assembly 80 causes this assembly to become disengaged from the cup seal 72 thus leading the system to atmosphere through the port 43 as set forth above in connection with the operation of the system during an emergency break-away. At the same time the piston 140 associated with the trailer service line valve assembly 15 will become retracted so as to seal off the line 126 and render the master control valve assembly 22 inoperative to discharge air to the trailer service line 132.

The control system of the present invention is so designed that the operator is incapable of preventing operation of the above described automatically operable means for sealing off the tractor service system, i.e., the tractor pressure tank and its connections, from the trailer service line 132 during any of the contingencies outlined above and, regardless of the fact that the operator may maintain the plunger 46 manually depressed, automatic means will be set into operation for sealing off the tractor pressure tank 14 whenever the pressure of air within this tank falls below any predetermined minimum. Assuming, for example, that the operator manually maintains the plunger 46 fully depressed and that pressure of air in the tank 14 falls below the predetermined minimum, the reduction of pressure within the counterbore 66 of the fitting 34 will be transmitted through the port 64 and longitudinal bore 58 to the port 60 and 62 whereupon the internal pressure within the floating valve assembly 80 will be reduced to such an extent that there is insufficient pressure acting on this assembly to maintain the spring 74 compressed. The spring will thus force the floating piston assembly 80 to the left as viewed in Fig. 1 thus causing the end region 98 of the assembly to be withdrawn from the cup seal 72. At this time air pressure in the system leading from the trailer emergency line 172 through the port 154, line 116 and passage 112 will be bled through the cup seal 72 and exhaust passage 43 to the atmosphere. The consequent reduction of pressure at the port 154 will allow the spring 144 to retract the piston 140 thus withdrawing the radial port 150 from the enlarged bore 153 and sealing off the tractor pressure tank 14 as previously described. Maintenance of the plunger 46 in its advanced position is thus ineffective to override the action of the floating piston assembly 80.

While a preferred form of the invention has been shown in the drawings and described herein, it should be understood that the invention is not limited to the specific disclosure made and that the appended claims should be construed as broadly as the prior art will permit.

Having thus described the invention what I claim as new and desire to secure by Letters Patent is:

1. A control valve construction designed for use in the braking system of a tractor-trailer combination having a tractor pressure tank, an emergency line and a service line, said valve construction comprising in combination a composite valve body provided with an axial bore extending completely therethrough and provided at one end with an enlarged counterbore establishing a fluid inlet adapted to be connected to the pressure tank, said valve body being formed with a fluid outlet adapted to be connected to the emergency and service lines, a manually operable plunger slidable axially in said bore between a forward advanced position and a rearward retracted position, an abutment on said plunger, a freely floating piston slidable on said plunger and within said bore and movable between an advanced position and a retracted position, said piston being engageable with said abutment form maintaining said plunger in its advanced position when the piston is in its advanced position, spring means normally urging the piston to its retracted position, a by-pass in communication with said fluid outlet and extending around said piston and communicating with said bore at opposite ends of the by-pass, said plunger being formed with a longitudinal passage therein opening at its opposite ends into said bore on opposite sides of the piston through forward and rearward radial ports respectively, the forward port being so disposed as to be projected into said counterbore when the plunger is in its advanced position and to be retracted into said bore in sealing relation when the plunger is in its retracted position, an exhaust outlet establishing communication between said bore and the atmosphere, said exhaust port communicating with said by-pass when said piston is in its retracted position, and valve means on said piston effectively sealing said exhaust port from said by-pass when the piston is in its advanced position.

2. A control valve construction as set forth in claim 1 including, additionally, unidirectional valve means disposed in said by-pass permitting fluid to flow from said bore to said by-pass while preventing return flow of such fluid.

3. A control valve construction as set forth in claim 1 wherein said abutment on the plunger is in the form of a piston operable within and axially slidable relative to the floating piston and subject to movement due to fluid pressure differential on opposite sides thereof, said longitudinal passage in said plunger opening into said floating piston on the forward side of said abutment through a medial radial port intermediate said other radial ports.

References Cited in the file of this patent

UNITED STATES PATENTS

| 2,386,585 | Blank | Oct. 9, 1945 |
| 2,534,871 | Lichtman | Dec. 19, 1950 |
| 2,657,701 | Hupp | Nov. 3, 1953 |
| 2,700,435 | Seale | Jan. 25, 1955 |
| 2,766,766 | White | Oct. 16, 1956 |